A. S. Lyman's Refrigerating Car
No. 121,530.
Patented Dec. 5, 1871.
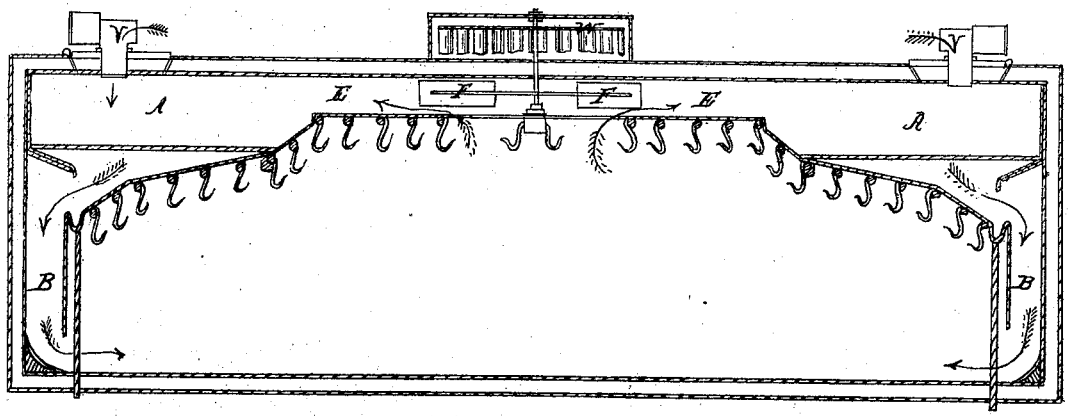
Witnesses.
Edward M. Lyman.
Inventor
Azel Storrs Lyman

UNITED STATES PATENT OFFICE.

AZEL STORRS LYMAN, OF NEW YORK, N. Y.

IMPROVEMENT IN REFRIGERATING-CARS.

Specification forming part of Letters Patent No. 121,530, dated December 5, 1871; antedated November 24, 1871.

*To all whom it may concern:*

Be it known that I, AZEL STORRS LYMAN, of the city, county, and State of New York, have invented new and useful Improvements in Ventilating and Cooling Refrigerating-Cars; and I do hereby declare that the following is a full and exact description thereof, reference being had to the accompanying drawings, which show a vertical longitudinal section, and to the letters of reference marked thereon.

To enable others skilled in the art to make and use my invention, I will proceed to describe its construction and operation.

I build a car with the top, bottom, and sides made double and the spaces between them filled with slabs of cork or other bad-conducting material. In the upper part of each end of this car I have a reservoir of ice, A, on a grate, and below this grate a descending cold or pure air flue, B. This combination was secured to me by a patent dated March 25, 1856. To increase the circulation I place a fan, F, in the center of the upper part of the car and extend a flue, c, each way from it over the meat-chamber to the reservoir of ice. On the same spindle with this fan, above it and outside of the car, I have a wind-wheel, W, so arranged that when the wind blows or the car moves rapidly through the air the wind-wheel is made to revolve and drive the fan and insure the circulation of the air in the car, as indicated by the arrows. For the purpose of ventilating the car I use a receiving-cowl, V, by which the air is forced into the car directly upon the surface of the ice, where it leaves all dust and comes out under the meat pure and cold. This forces out air by the joints around the doors of the car and prevents the admission of dust by these sources.

In ventilating and cooling passenger-cars or dwellings I would dispense with the wind-wheel, the fan, and its flues, and make the reservoir of cooling or disinfecting material much smaller in proportion, and the receiving-cowl many times larger, so that its area shall equal that of the descending flue.

What I claim as my invention, and desire to secure by Letters Patent, is—

1. The combination of the fan driven by the wind-wheel on its spindle with the reservoir of cooling material and the descending cold-air flue, in the manner substantially as and for the purposes specified.

2. The combination of the injector or receiving-cowl with the reservoir of cooling material and the descending cold-air flue, substantially as and for the purposes specified.

AZEL STORRS LYMAN.

Witnesses:
EDWARD M. LYMAN,
C. E. CRARY.

(58)